US006942710B2

United States Patent
Milano

(10) Patent No.: US 6,942,710 B2
(45) Date of Patent: Sep. 13, 2005

(54) DUCT END FILTER APPARATUS

(76) Inventor: Albert M. Milano, P.O. Box 14091, Poland, OH (US) 14091

( * ) Notice: Subject to any disclaimer, the term of this patent is extended or adjusted under 35 U.S.C. 154(b) by 0 days.

(21) Appl. No.: 10/397,058

(22) Filed: Mar. 25, 2003

(65) Prior Publication Data

US 2004/0003718 A1 Jan. 8, 2004

Related U.S. Application Data

(60) Provisional application No. 60/367,669, filed on Mar. 26, 2002.

(51) Int. Cl.⁷ .............................................. B01D 25/00
(52) U.S. Cl. ............................ 55/480; 55/481; 55/492; 55/493; 55/508; 55/511; 55/DIG. 31; 55/DIG. 35; 55/DIG. 37
(58) Field of Search .......................... 55/480, 481, 492, 55/493, 508, 511, DIG. 31, DIG. 35, DIG. 37

(56) References Cited

U.S. PATENT DOCUMENTS

| 4,334,899 A | | 6/1982 | McConnell |
| 4,601,737 A | | 7/1986 | Gerbig |
| 5,114,448 A | | 5/1992 | Bartilson |
| 5,176,570 A | | 1/1993 | Liedl |
| 5,183,488 A | * | 2/1993 | Deering ....................... 55/320 |
| 5,462,569 A | | 10/1995 | Benjamin |
| 5,525,145 A | | 6/1996 | Hodge |
| 5,689,969 A | | 11/1997 | Conroy |
| 5,863,310 A | | 1/1999 | Brown et al. |
| 6,030,427 A | * | 2/2000 | Sorice et al. .................. 55/480 |
| 6,361,578 B1 | * | 3/2002 | Rubinson ...................... 55/487 |

* cited by examiner

Primary Examiner—Minh-Chau T. Pham
(74) Attorney, Agent, or Firm—Hahn Loeser & Parks, LLP; Robert J. Clark

(57) ABSTRACT

The present invention is an improved duct end filtering device which increases the efficiency of a duct-end filter and which increases the ease with which filters can be removed and replaced.

8 Claims, 3 Drawing Sheets

DUCT END FILTER APPARATUS

This application claims benefit of a provisional application No. 60/367,669 filed on Mar. 26, 2002.

TECHNICAL FIELD

This invention relates to improvements in a duct end filter apparatus, and more particularly to novel means for increasing the efficiency of and removing of the filter components of the same.

BACKGROUND OF THE INVENTION

1. Field of the Invention

The present invention relates to a Filter Apparatus and more particularly pertains to an Improved Duct End Filter Apparatus which permits a user to readily change filter inserts by novel means and which also contains novel means designed to maximize the filter's efficiency by increasing the filter's contact with the grill.

2. Description of the Prior Art

The use of Filter Apparatus is known in the prior art. More specifically, Filter Apparatus heretofore devised and utilized are known to consist basically of familiar, expected and obvious structural configurations, notwithstanding the wide variety of designs encompassed by the crowded prior art which have been developed for the fulfillment of myriad objectives and requirements.

Known prior art Filter Apparatus include U.S. Pat. Nos. 4,334,899, 5,114,448, 5,176,570, 5,462,569, 5,525,145, 5,689,969, and 5,863,310. Known prior art devices which specifically increase a filter's contact with a frame include U.S. Pat. No. 4,601,737.

While these devices fulfill their respective, particular objectives and requirements, the aforementioned patents do not disclose an Improved Duct End Filter Apparatus. The inventive device includes a filter insert, a grill, a housing with sub-elements that increase the surface contact between the filter insert and the grill, and a filter support frame, or bezel, which facilitates the easy removal of the filter insert.

In these respects, the Improved Duct End Filter Apparatus according to the present invention substantially departs from the conventional concepts and designs of the prior art, and in so doing provides an apparatus which significantly improves the efficiency and ease of maintenance of conventional duct end filter apparatus.

SUMMARY OF THE INVENTION

It is among the objectives of the invention to provide a duct end filtering apparatus which improves the efficiency of the filter by increasing the degree to which the filter contacts the grill and housing.

Another objective of the invention is to facilitate easy removal of the filter by means of a grill that friction-fits into the housing and a filter that is in slideable engagement with the grill and bezel.

A further objective of the invention is to provide a vent or cold air return device which installs in such a way that no screws are apparent from the device's exterior.

Still another objective of the invention is to provide the aforementioned increased filtering efficiency at a lower cost by virtue of the invention's lack of a need for gaskets or seals aside from those produced by its novel friction fit design.

Another objective of the invention is to provide a duct end filtering system that is made of plastic that is colored, thereby eliminating the need to paint the components of the system that normally would require painting.

In accordance with the invention there is provided a housing of the sort designed for forced air heating and cooling vents or for cold air return vents. The housing may contain pre-drilled holes for mounting which are preferably positioned such that they will be covered by the grill when that element is in place. The housing contains sub-elements which are designed to facilitate the filter's contact with the grill. In the case of one embodiment of vents, these sub-elements are one or more, preferably two, extensions from the housing apparatus. In the case of a second embodiment of vents, this sub-element extends at least partially along the back of the housing element, preferably across the housing element, and the sub-element contacts the filter by means of extensions from the sub-element. The housing further contains one or more slots designed to accept hinge flanges attached to the grill and a lip area or areas along the inside of its opening for accepting the friction-fit flange or flanges attached to the grill element.

In further accordance with the invention there is provided a grill that connects to the housing by means of one or more, hinge flange sub-elements preferably located at the bottom of the grill and a friction fit by means of one or more, flange sub-elements preferably located at the top of the grill. The grill may contain fixed or adjustable louvers for the direction of air flow. There is also provided a filter which may or may not be disposable and which may be of a 2-ply construction. The filter preferably contacts the grill and the sub-elements of the housing element and rests inside of the bezel element. The bezel is attached, preferably in a non-removable fashion, to the grill and permits the filter to be slid in and out easily. The grill attaches to the housing, or is held in place by, snap fit means such as tabs or flanges. The outer dimensions of the bezel attached to the grill are preferably less than or equal to the outer dimensions of the bottom and sides of the housing and the inner dimensions of the bezel are preferably greater than or equal to the dimensions of the area of the grill element through which air flows. In any event, the bezel should preferably not significantly impede the flow of air through the filter element or the grill element.

Any or all of the components of the apparatus, including the housing, bezel, and grill, may be made of plastic, preferably ABS. Elements made of plastic may be pigmented in any desired color.

These and other objects and advantages will become apparent from the following description of two particular forms of the invention as illustrated in the accompanying drawings, in which:

DESCRIPTION OF THE PREFERRED EMBODIMENT

Figure 1:
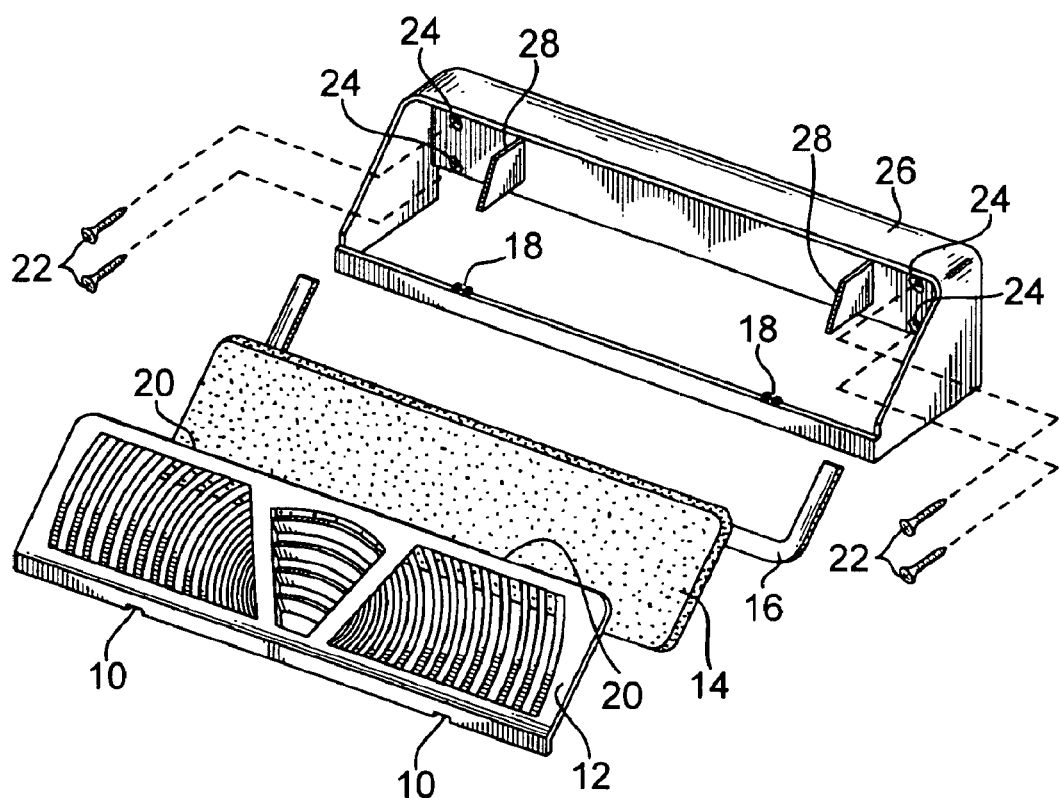
FIG. 1 is an exploded front view of the invention as the invention is embodied as a hot or cold air vent.

Referring now to the drawings in which like reference numerals index like parts, there are shown the preferred embodiments of the present invention both as a cold or hot air vent and as a cold air return vent.

The embodiment illustrated in FIG. 1 is intended for use as a duct end filtering apparatus for attachment most commonly to a heating or air conditioning vent. In the embodiment illustrated in FIG. 1, the housing element 26 mounts to a surface by means of screws 22. The housing has predrilled holes to accept the screws 24, which predrilled holes are located such that they will not preferably be visible from the exterior of the apparatus when it is fully assembled. The louvered grill 12 attaches to the housing 26 first by means of the hinge flanges 10 which are accepted by the corresponding hinge notches 18. The filter 14 is placed behind the grill element 12 by sliding it behind the grill 12 into the bezel 16 attached to the grill 12. The grill is then affixed to the housing element 26 by means of the snap-fit flanges 20. When the entire apparatus is assembled, the extensions 28 protruding from the housing 26 will be in contact with the filter 14 and will hold the filter 14 in close proximity to the grill 12. In this embodiment the grill 12, housing 26, bezel 16, and extensions protruding from the housing 26 are made of ABS plastic.

In use, a user would first affix the housing 26 to a wall at a duct end of an air conditioning or heating system by means of screws 22, which screws would be accepted by the predrilled holes 24. The user would then affix the lower portion of the combined grill 12 and bezel 16 to the housing 26 by means of inserting the hinge flanges 10 into the corresponding hinge notches 18. The user would then slide the filter 14 behind the grill 12 and into the bezel 16. Finally, the user would close the system by attaching the top of the grill 12 to the housing 26 by pressing the snap-fit flanges 20 into the housing 26, where they engage in a snap-fit. Once the system is assembled, it would filter air passing through it, which filtering would be improved by means of the extensions 28 holding the filter 14 close to the grill 12. The user would be able to readily change the filter 14 by first opening the snap-fit of the top of the grill 12 to the housing 26 and then pivoting the grill 12 along the hinge formed by the hinge flanges 10 and the corresponding hinge notches 18, sliding the filter 14 out from behind the grill 12 and inserting either the same filter after it has been cleaned or else an entirely new filter.

Figure 2:
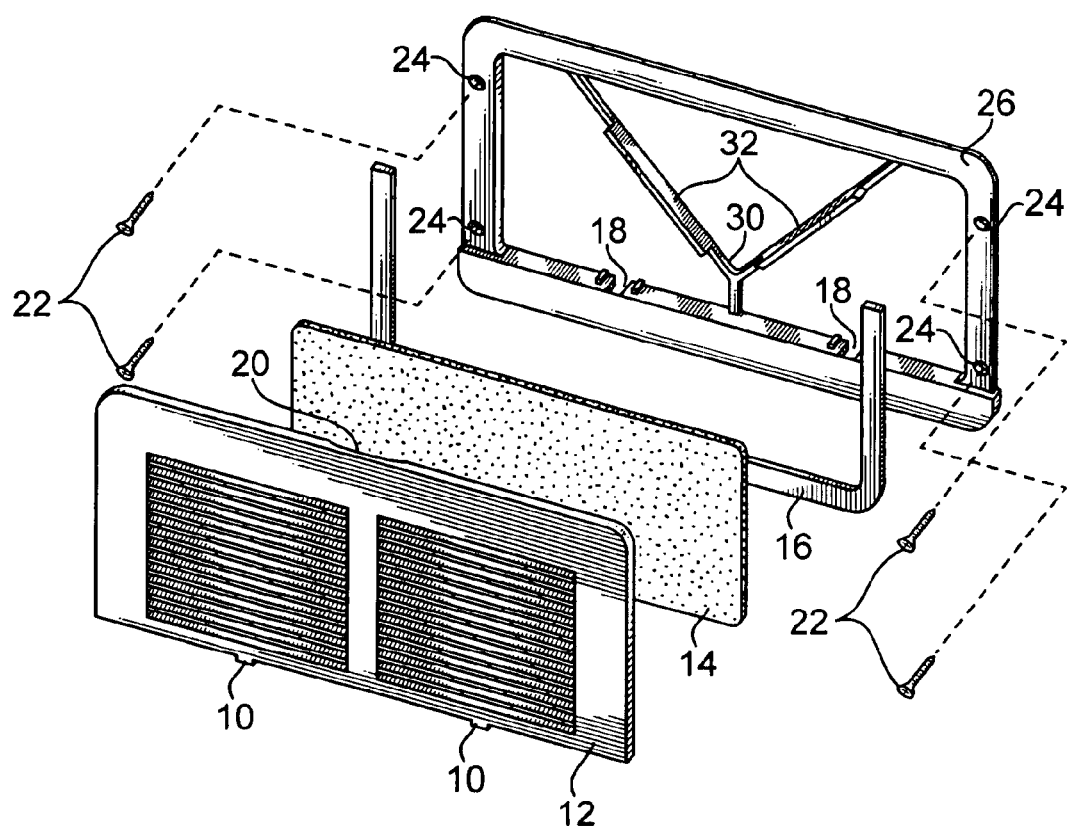
FIG. 2 is an exploded front view of the invention as the invention is embodied as a cold air return vent.

The embodiment illustrated in FIG. 2 is intended for use as a duct end filtering apparatus most commonly for attachment to a cold air return vent. In the embodiment illustrated in FIG. 2, the housing element 26 mounts to a surface by means of screws 22. The housing has predrilled holes to accept the screws 24, which predrilled holes are located such that they will not be visible from the exterior of the apparatus when it is fully assembled. The louvered grill 12 attaches to the housing 26 first by means of the hinge flanges 10 which are accepted by the corresponding hinge notches 18. The filter 14 is placed behind the grill 12 by sliding it behind the grill 12 into the bezel 16 attached to the grill 12. The grill 12 is then affixed to the housing 26 by means of the snap-fit flanges 20. When the entire apparatus is assembled, the cross-member sub-element 30 will hold the filter element 14 in close proximity with the grill element 12 by virtue of the raised portions' 32 of the cross-member sub-element 30 contact with the filter element 14. In this embodiment the grill 12, housing 26, bezel 16, cross-member sub-element 30 and the raised portions of the cross-member sub-element 32 are made of ABS plastic. Alternatively, the housing of each embodiment may not require predrilled holes and it is contemplated that the bezel may be attached to the housing while still accomplishing the purposes of the invention.

Figure 3:
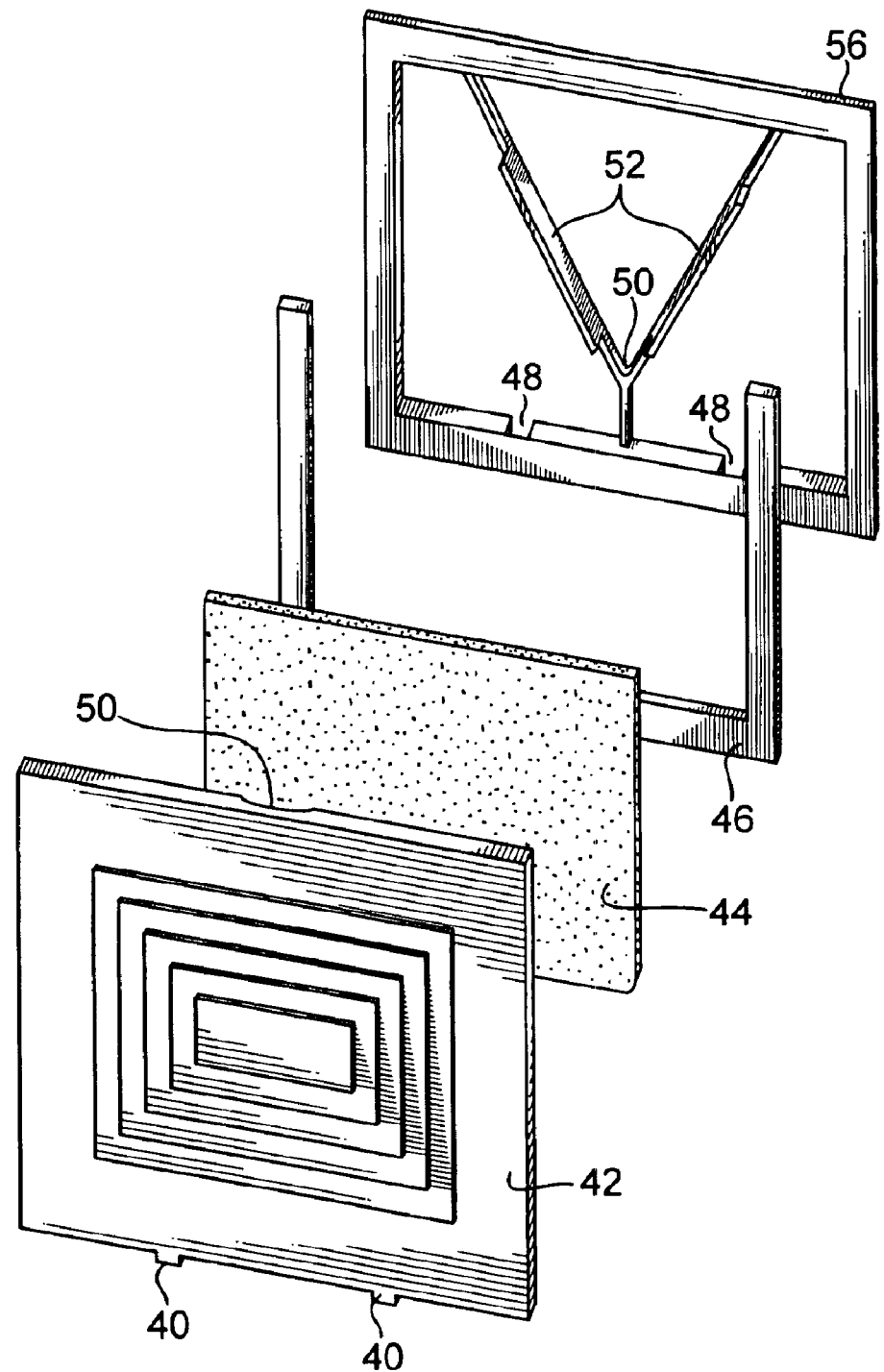
FIG. 3 is an exploded front view of the invention as the invention is embodied as a multi-direction diffuser.

In use, a user would first affix the housing 26 to a wall at a duct end of an air conditioning or heating system by means of screws 22, which screws would be accepted by the predrilled holes 24. The user would then affix the lower portion of the combined grill 12 and bezel 16 to the housing 26 by means of inserting the hinge flanges 10 into the corresponding hinge notches 18. The user would then slide the filter 14 behind the grill 12 and into the bezel 16. Finally, the user would close the system by attaching the top of the grill 12 to the housing 26 by pressing the snap-fit flanges 20 into the housing 26, where they engage in a snap-fit. Once the system is assembled, it would filter air passing through it, which filtering would be improved by means of the raised portions 32 of the cross-member holding the filter 14 close to the grill 12. The user would be able to readily change the filter 14 by first opening the snap-fit of the top of the grill 12 to the housing 26 and then pivoting the grill 12 along the hinge formed by the hinge flanges 10 and the corresponding hinge notches 18, sliding the filter 14 out from behind the grill 12 and inserting either the same filter after it has been cleaned or else an entirely new filter. Yet a further embodiment is shown in FIG. 3 as a multi-direction diffuser commonly used in industrial or commercial heating or air conditioning systems. Such a diffuser is available commonly available as a one, two, three or four way deflector and located at the open end of a duct, either mounted vertically in a wall or horizontally as suspended from a ceiling, This diffuser unit also contains a removable filter, a grill with an attached bezel 46 for slideably engaging the filter 44. When suspended from the ceiling the housing 56 may actually lay between the overhead ceiling tiles attached to the heat or cold end cap by an adapter which engages the grill in a hinged snap-fit or locking mechanism (40, 48) in order that the filter is held in close proximity to the grill 42.

A preferred filter for all embodiments in a 2 ply construction with a first layer polysorb pad and a second layer of laminated polysorb and electret, one such source being Columbus Industries, Inc, of Ashville, Ohio. However, it should be recognized that any number of filter materials intended to trap or collect airborne particles is contemplated. It is expected that the choice of filter material may vary based on the types and sizes of airborne particles to be collected.

What is claimed is:

1. A filtered air vent apparatus comprising:
    a vent housing body comprising at least four sides forming an air passageway between at least a first open end and a second open end, the vent housing body further comprising at least two filter supports extending toward the first open end of the housing body;
    a grill hingedly attachable to the vent housing body and securable to the vent housing body in a snap fit configuration;
    a bezel attached to the grill; and
    a filter slidably positionable between the grill and the bezel;
    wherein the at least two filter supports of the vent housing body engage the filter at a location spaced from a perimeter of the filter and hold the filter against the grill when the grill is secured over the first opening of the housing and the at least two filter supports of the vent housing body disengage the filter when the grill is hingedly opened, allowing the filter to be slidably removed from the grill and attached bezel.

2. The vent of claim 1, wherein the at east two filter supports of the vent housing body are formed integral to a support arm extending from at least one side of the housing body.

3. The vent of claim 1, wherein the vent is an air return vent.

4. The vent of claim 1, wherein the vent is a heating or air conditioning vent.

5. A filtered air vent apparatus comprising:

a monolithic, plastic vent housing body comprising at least four sides forming an air passageway between at least a first open end and a second open end, the monolithic, plastic vent housing body further comprising at least two filter supports extending from at least one of the at least four sides of the housing body toward the first open end of the housing body;

a monolithic, plastic grill hingedly attachable to the vent housing body and securable to the vent housing body in a snap fit configuration;

a plastic bezel attached to the grill;

a filter slidably positionable between the grill and the bezel;

wherein the at least two filter supports of the vent housing body engage the filter at a location spaced from a perimeter of the filter and hold the filter against the grill when the grill is secured over the first opening of the housing and wherein the at least two filter supports of the vent housing body disengage the filter when the grill is hingedly opened, allowing the filter to be slidably removed from the grill and attached bezel.

6. The vent of claim 5, wherein the at east two filter supports of the vent housing body are formed integral to a support arm extending from at least one side of the housing body.

7. The vent of claim 5, wherein the vent is an air return vent.

8. The vent of claim 5, wherein the vent is a heating or air conditioning vent.

* * * * *